United States Patent Office 3,623,395
Patented Nov. 30, 1971

3,623,395
METHOD OF PREPARING SLURRIED EXPLOSIVES MIXTURES
Julius H. Paasch and Conrad W. Ehmke, North Rand, Transvaal, Republic of South Africa, assignors to African Explosives and Chemical Industries Limited, Johannesburg, Transvaal, Republic of South Africa
No Drawing. Original application Aug. 15, 1968, Ser. No. 754,113, now Patent No. 3,467,559, dated Sept. 16, 1969. Divided and this application Jan. 30, 1969, Ser. No. 833,210
Claims priority, application Republic of South Africa, Oct. 22, 1965, 65/5,703; Nov. 2, 1965, 65/5,903
Int. Cl. F42b 3/02, 33/02
U.S. Cl. 86—20     9 Claims

ABSTRACT OF THE DISCLOSURE

Method of preparing a slurried explosives mixture of water, inorganic oxidizing salt, gelling agent, fuel and sensitizer which involves first forming a non-explosive mixture by mixing together all of the components except for the amount of oxidizing salt necessary to render the mixture explosive, to facilitate storage and transport and adding the oxidizing salt to complete the explosives mixture at the point and time of use and charging a borehole.

---

This is a division of my copending application Ser. No. 754,113, filed Aug. 15, 1968 as a continuation of application Ser. No. 587,389, filed Oct. 18, 1966, now abandoned.

The copending application Ser. No. 754,113 has issued as U.S. Pat. 3,467,559, dated Sept. 16, 1969.

This invention relates to the preparation of slurried explosives mixtures.

There is a trend in many countries towards the greater use of slurried explosives mixtures for blasting purposes since their initial introduction within the last decade. However, when all the ingredients of such mixtures are premixed to form explosives, their transport, storage and use fall within the terms of various provisions of the laws on explosives, requiring the observation of certain strictly prescribed conditions for transport and storage. Moreover, in several countries mixing the ingredients of an explosive in the field is either illegal or is strictly controlled by regulation and inspection, primarily in the interests of accident prevention.

It is object of this invention to improve the safety factor in the use of slurried explosives mixtures. It is a further object of this invention to provide a procedure for preparing slurried explosives mixtures, the components of which are insensitive until actually required for blasting.

According to this invention, there is provided a method of preparing a slurried, explosives mixture consisting in mixing a non-explosive mixture containing harmless ingredients with the required proportion of at least one inorganic oxidising salt to form an explosives mixture and placing the explosives mixture in a position for blasting.

Further, according to this invention, there is provided a method of preparing a slurried, explosives mixture consisting in mixing together the required proportions of harmless ingredients into a non-explosive mixture, mixing the non-explosive mixture with the required proportion of at least one inorganic oxidising salt to form an explosives mixture and placing the explosives mixture in a position for blasting.

The harmless ingredients used in the preparation of a slurried, explosives mixture following the procedure under the invention include water, a gelling agent, a fuel and a sensitiser. The fuel may be a light metal, for instance aluminium in powdered or granular form, or it may be a carbonaceous substance, for instance, anthracite in powdered or crushed particles.

The sensitiser included in the non-explosive mixture may be selected, for instance, from any one or more of the group sulphur, aluminium or molasses in the form desired for the mixture.

By the expression "harmless ingredient" as used in this specification is meant an ingredient which is itself not self-explosive nor forms an explosive when in admixture with other harmless ingredients but excludes any inorganic oxidising salt. Nevertheless, sodium nitrate or other nitrate can be added to the premixed non-explosive mixture provided that the proportion of such salt in the mixture is low enough not to form an explosives mixture.

The inorganic oxidising salt forming part of the explosives mixture may be ammonium nitrate, which may be present in any suitable form as required, including discrete, particulate solids, for example prills whether dense or porous. Other salts sutable for the purpose are sodium nitrate and potassium nitrate and at least one of these may be used in admixture with ammonium nitrate.

The following two examples of non-explosive mixtures and the inorganic oxidising salts which, in admixture with them, will create explosives mixtures, are given merely by way of illustrating the invention.

The percentages of ingredients are by weight.

|  | Example 1 | Example 2 |
|---|---|---|
| Harmless ingredients: | | |
| Water | 13 | 15 |
| Anthracite | | 3 |
| Aluminium | 20 | 9 |
| Sulphur | | 2 |
| Guar gum | 1 | 1 |
| Inorganic oxidising salt: | | |
| Ammonium nitrate | 66 | 60 |
| Sodium nitrate | | 10 |

The procedure of preparing explosives mixtures according to this method enables users of blasting explosives to store quantities of pre-mixed slurried gels in containers of convenient size and ammonium nitrate or other salts in separate containers for reasonable periods of time and use them for blasting purposes as and when required without incurring risks of premature explosion. The explosives mixture is prepared in any suitable device for immediate deposit or extrusion into boreholes after mixing.

Variations in the explosive power of mixtures may be made by changing the ingredients of non-explosive mixtures. A borehole may thus be charged firstly with a minor quantity of a more powerful explosives mixture followed by a major quantity of a less powerful explosives mixture by mixing and placing two different grades of non-explosive mixtures with the required proportions of inorganic oxidising salt. These quantities of explosives mixtures may be reversed or increased or decreased as desired. For instance, a quantity of fuel such as aluminium may be present in, or mixed on site with, a non-explosive mixture, which is then made explosive by the addition of a salt and deposited in the borehole up to a certain level or according to a measured amount. This explosive mixture may be covered in the borehole by a further, less powerful mixture containing a smaller quantity of fuel. In a continuous operation, using mixer-placer apparatus, an extra quantity of fuel, which again may be aluminium, may be added if desired during the mixing operation of the salt and a premixed non-explosive mixture already containing a fuel, for example aluminium, to give a more powerful explosives mixture.

Two tests of each of five different explosives mixtures were conducted, the non-explosive mixture component of the final explosives mixture having been prepared and stored for twenty-four hours before use. The results obtained are given below and the figures represent percentages by weight of the total mixture in each case.

| Example | 1 | 2 | 3 | 4 | 5 |
|---|---|---|---|---|---|
| Sugar | 13 | 5 | | | |
| Glycerol | | | 10 | 13 | |
| Water | 15 | 15 | 15 | 15 | 15 |
| Sodium nitrate | | | | | 10 |
| Guar gum | 1 | 1 | 0.8 | 0.8 | 0.8 |
| Non-explosive mixture | 29 | 21 | 25.8 | 28.8 | 25.8 |
| Ammonium nitrate (dense prills) | 71 | 69 | 71.2 | 71.2 | 60.2 |
| Aluminium: | | | | | |
| Paint fine | | | | | 3 |
| Granular | | 10 | 3 | | 11 |
| Density of explosives mixture (gram/ml.) | 0.9 | 0.9 | 0.9 | 0.9 | 1.1 |

Each explosives mixture was detonated in a 1½″ diameter steel pipe by a 50 gram pentolite booster and the following velocities of detonation in metres per second were obtained.

| Example | 1 | 2 | 3 | 4 | 5 |
|---|---|---|---|---|---|
| V.O.D | 3,700 | 3,550 | 3,550 | 3,700 | 3,300 |
| V.O.D | 3,750 | 3,600 | 3,650 | 3,650 | 3,700 |

An important aspect of this invention is that the power of the explosives mixture can be varied continuously from the toe of the borehole upwardly by altering the proportion of the aluminium in the mixture.

Following the procedure of preparing explosives mixtures according to the invention, there is provided a blasting agent or explosive charge, which becomes sensitive to initiation within a period of time subsequent to mixing and placing in a position for blasting. This period of time may be related to, or controlled by, the viscosity of the gel of each non-explosive mixture, to which the inorganic oxidising salt is added.

The explosives mixture becomes sensitive as soon as a portion of the salt goes into solution and the rate of solution of the salt may be varied, principally by varying the proportions and/or the type of gelling agent to be present in the pre-mixed non-explosive mixture. In other words, by varying the composition of the non-explosive mixture, the period of time within which an explosives mixture becomes sensitive to initiation as an explosive charge within a blast hole or other site after mixing and placing may be substantially pre-determined.

Apparatus for preparing explosives mixtures is described in our co-pending application number 65/4,653. Patent application 65/4,653 relates to an apparatus for mixing and delivering flowable explosives mixtures directly into bore holes to be blasted. The apparatus of that invention is particularly suited to carrying out the method of preparing explosives mixtures according to the instant invention. By feeding the slurried non-explosive mixture with the correct proportion of ammonium nitrate or other selected salt and additional fuel, if desired, the operator, by means of this apparatus, may deliver the explosives mixture directly into a borehole in one continuous operation.

An important advantage of the persent invention resides in its avoidance of aqueous solutions of ammonium nitrate and the difficulties attendant on their use. Such solutions must be transported, stored and handled at elevated temperatures to prevent crystallisation before mixing with the other ingredients. There is the additional problem that ammonium nitrate solutions may not form slurried gels with other ingredients at low temperatures. This invention teaches the use of water in pre-mixed slurried gels alone, thereby precluding undesirable separation or segregation of the harmless ingredients during transport, storage and handling and ensuring homogeneous, slurried explosives mixtures when finally combined with inorganic oxidising salts.

What is claimed is:

1. A method for preparing and using slurried explosives mixtures, the components of which become sensitive to initiation after (I) mixing the components and (II) running the mixture into the borehole to be blasted, comprising:
   (a) forming a nonexplosive aqueous mixture comprising water, gelling agent, fuel and sensitizing agent; and thereafter
   (b) adding a sufficient quantity of solid, particulate inorganic oxidizing salt, which is soluble in said nonexplosive aqueous mixture, to said nonexplosive aqueous mixture, to cause the resulting mixture to become sensitive to initiation upon the dissolution of said inorganic oxidizing salt in said nonexplosive aqueous mixture.
   (c) charging a borehole with the resulting mixture.

2. A method according to claim 1 including performing steps (b) and (c) substantially simultaneously.

3. A method according to claim 2 further including: adding a continuously varying additional amount of fuel to said resulting mixture during performance of step (c) to vary the explosive power of the explosives mixture upwardly from the toe of the borehole.

4. A method according to claim 1, further comprising:
   (d) forming a second nonexplosive aqueous mixture comprising water, gelling agent, fuel and sensitizing agent wherein at least one said ingredient is present in substantially different amount in the second nonexplosive aqueous mixture than in the first-mentioned nonexplosive aqueous mixture; thereafter
   (e) adding a sufficient quantity of solid, particulate inorganic oxidizing salt which is soluble in said second nonexplosive aqueous mixture, to said second nonexplosive aqueous mixture, to cause the resulting second mixture to become sensitive to initiation upon the dissolution of said inorganic oxidizing salt in said second nonexplosive aqueous mixture;
   (f) charging the resulting second mixture into said borehole above the first-mentioned resulting mixture.

5. A method according to claim 4 wherein steps (e) and (f) are performed simultaneously.

6. A method according to claim 4 wherein the amount of fuel in said second nonexplosive aqueous mixture is reduced compared to that in the first-mentioned nonexplosive aqueous mixture for reducing the explosive power of the second resulting mixture compared to that of the first-mentioned resulting mixture.

7. A method according to claim 4 wherein the amount of fuel in said second nonexplosive aqueous mixture is increased compared to that in the first-mentioned nonexplosive aqueous mixture for increasing the explosive power of the second resulting mixture compared to that of the first-mentioned resulting mixture.

8. A method according to claim 7 wherein said second nonexplosive aqueous mixture is prepared from quanta of said first-mentioned nonexplosive aqueous mixture by:
   (g) adding additional fuel to the latter.

9. A method according to claim 8, wherein steps (e), (f) and (g) are performed substantially simultaneously.

References Cited

UNITED STATES PATENTS

| 2,929,325 | 3/1960 | Lewis | 86—1 X |
| 2,955,534 | 10/1960 | Lambert et al. | 86—1 X |
| 3,303,738 | 2/1967 | Clay et al. | 86—1 X |

BENJAMIN A. BORCHELT, Primary Examiner

J. J. DEVITT, Assistant Examiner

U.S. Cl. X.R.

86—1; 102—23; 149—44